MAGNETIC TYPE CIRCUIT BREAKER

Original Filed July 26, 1963 10 Sheets-Sheet 1

Inventors:
Clifford A. Bodge,
Martin W. Lawson,
by Harold Levine
Att'y.

Witness: Edward J. Connors Jr.

June 11, 1968 M. W. LAWSON ET AL 3,388,357

MAGNETIC TYPE CIRCUIT BREAKER

Original Filed July 26, 1963 10 Sheets-Sheet 2

Inventors:
Clifford A. Bodge,
Martin W. Lawson,
by Harold Levine
Att'y.

Witness: Edward J. Connors Jr.

Inventors:
Clifford A. Bodge,
Martin W. Lawson,
by Harold Levine
Att'y.

Witness: Edward J. Connors Jr.

June 11, 1968 M. W. LAWSON ET AL 3,388,357

MAGNETIC TYPE CIRCUIT BREAKER

Original Filed July 26, 1963 10 Sheets-Sheet 4

Inventors:
Clifford A. Bodge,
Martin W. Lawson,
by [signature]
Att'y.

Witness: [signature]

MAGNETIC TYPE CIRCUIT BREAKER

Original Filed July 26, 1963

Inventors:
Clifford A. Bodge,
Martin W. Lawson,
by Harold Levine Att'y.

Witness: Edward J. Connors Jr.

Inventors:
Clifford A. Bodge,
Martin W. Lawson,
by Harold Levine
Att'y.

Witness: Edward J. Connors Jr.

Inventors:
Clifford A. Bodge,
Martin W. Lawson,
by Harold Levine
Att'y.

Witness: Edward J. Connors Jr.

MAGNETIC TYPE CIRCUIT BREAKER

Original Filed July 26, 1963 10 Sheets-Sheet 8

Inventors:
Clifford A. Bodge,
Martin W. Lawson,
by Harold Levine
Att'y.

Witness: Edward J. Connors Jr.

Inventors:
Clifford A. Bodge,
Martin W. Lawson,
by Harold Levine Att'y.
Witness: Edward J. Connors Jr.

MAGNETIC TYPE CIRCUIT BREAKER

Original Filed July 26, 1963 10 Sheets-Sheet 10

Inventors:
Clifford A. Bodge,
Martin W. Lawson,
by Harold Levine
Atty.

Witness: Edward J. Connors Jr.

United States Patent Office 3,388,357
Patented June 11, 1968

3,388,357

MAGNETIC TYPE CIRCUIT BREAKER

Martin W. Lawson, North Easton, and Clifford A. Bodge, Attleboro, Mass., assignors to Texas Instruments Incorporated, Dallas, Tex., a corporation of Delaware Continuation of application Ser. No. 298,536, July 26, 1963. This application Sept. 2, 1966, Ser. No. 577,086
17 Claims. (Cl. 335—161)

ABSTRACT OF THE DISCLOSURE

A new and improved circuit breaker of the magnetic type is shown to comprise a frame mechanism embodying a substantially U-shaped frame, an arm pivotally mounted on said frame to support a movable contact, and magnetic means mounted on the frame for moving said arm under predetermined conditions; a housing assembly embodying a pair of insulating housing parts, means holding the parts together to define a chamber, a fixed contact mounted in the chamber, and a housing cover for use in mounting the circuit breaker on a control panel, the housing parts having abutments which engage extremities of the frame at a plurality of locations for completely entrapping the frame in a fixed location within the housing so that movement of the contact arm engages and disengages the fixed contact in the housing to close and open a circuit; and normally operable means connected to the frame mechanism for moving the contact arm to open and close the circuit. Alternate circuit breaker constructions are shown as well as circuit breaker constructions in which the housing parts form an additional enclosure or chamber for mounting an auxiliary switch, the auxiliary switch including a movable contact, an actuating member retained in a guideway formed on the housing enclosure, and a fixed contact, the actuating member being engageable with the movable contact arm for actuating the auxiliary switch contacts in response to movement of the contact arm in the main frame mechanism.

This application is a continuation of Ser. No. 298,536, filed July 26, 1963, now abandoned.

This invention relates to a new and improved circuit breaker and more particularly to a new and improved circuit breaker of the magnetic type for applications in which it is desired to interrupt a circuit under predetermined conditions.

Among the several objects of this invention is the provision of a new and improved magnetic circuit breaker assembly for the protection of electrical circuits and components against transients, sustained overloads and short circuits.

Another object of this invention is the provision of a magnetic circuit breaker assembly which is compact, lightweight and simple in design, which is easily manufactured and assembled into final operative condition, which requires a minimum number of parts in its construction, which, in at least one form, may be constructed in subminiature form and which is versatile in its applications.

It is a further object of the invention to provide a magnetic circuit breaker assembly which, in several of its embodiments, includes an auxiliary switch which is operable in response to operation of the primary circuit breaker assembly itself, and which is integrally contained in a compact package together with the circuit breaker assembly and housing.

A further object of the invention is the provision of a magnetic circuit breaker whose operation, and more particularly, whose contact engagement is relatively unaffected by vibrations and shock to which the panel or other assembly in which the magnetic circuit breaker is mounted might be subjected.

Other objects will be in part apparent and in part pointed out hereinafter.

The invention accordingly comprises the elements and combinations of elements, features of construction and arrangements of parts which will be exemplified in the structures hereinafter described and the scope of the application which will be indicated in the appended claims.

In the accompanying drawings in which several of the various possible embodiments of the invention are illustrated:

Similar reference characters indicate corresponding parts throughout the several views of the drawings.

Figure 1:
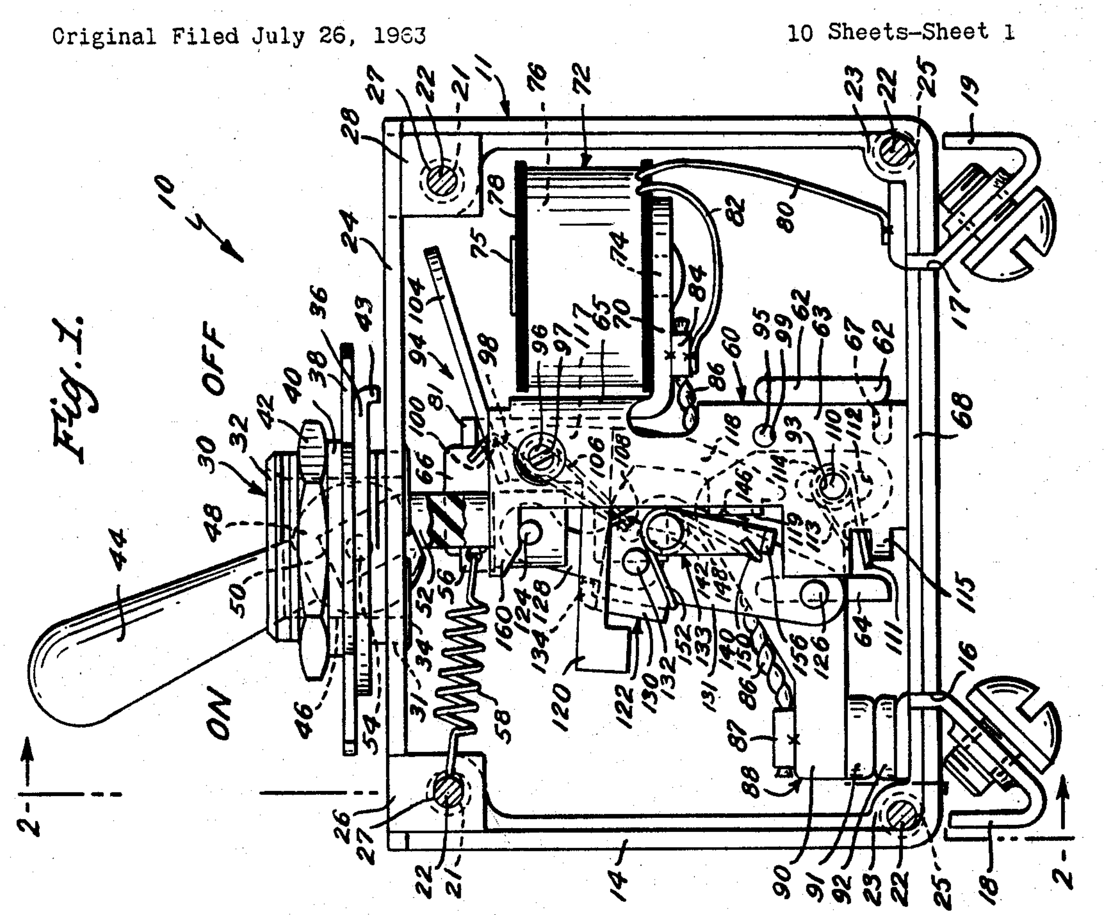
FIG. 1 is an elevational view of one of the various possible embodiments of the invention in which the front portion of the housing has been removed for clarity of illustration and in which the device is shown in the normal "on" or contacts-closed position.

Dimensions of certain of the parts as shown in the drawings may have been modified and/or exaggerated for the purposes of clarity of illustration.

Figure 2:
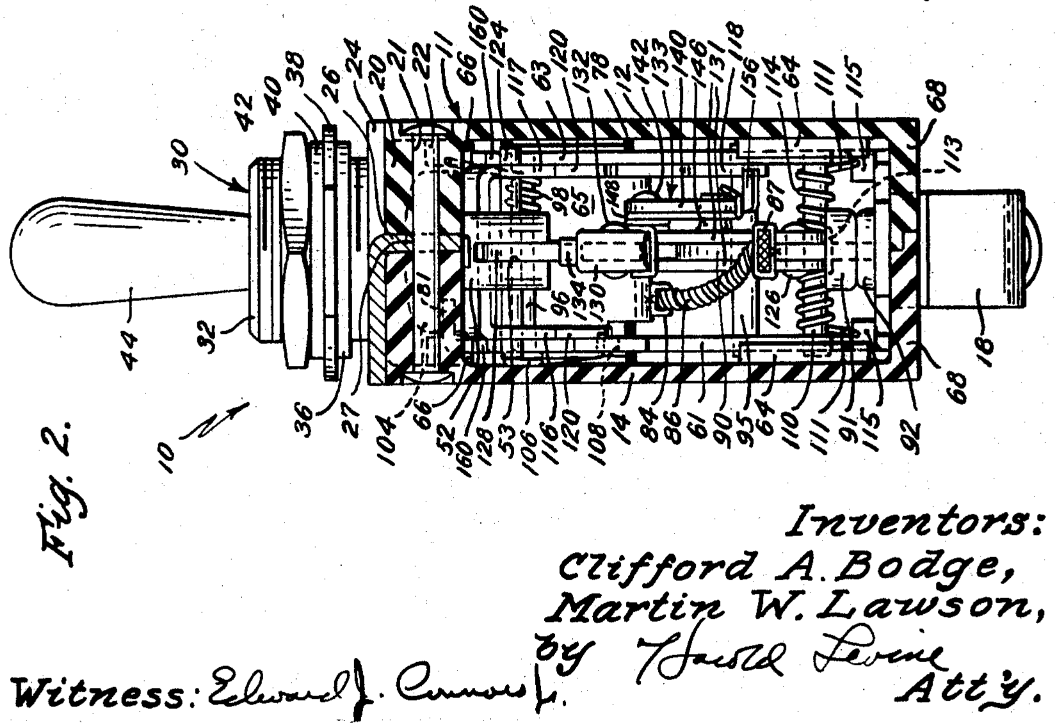
FIG. 2 is a sectional view taken along line 2—2 of FIG. 1 showing both portions of the housing in assembled condition.

Referring now to the drawings, and more particularly to FIGS. 1 and 2, one embodiment of the instant invention takes the form of a magnetic circuit breaker generally indicated by reference numeral 10, and includes a housing or casing 11 having a front portion 12 and a back portion 14 formed of a suitable electrical insulating material such as, for example, an arc-resistant, moldable, phenolic, resinous material. The housing 11 also includes apertures 16, 17, which receive terminals 18 and 19, respectively, made of a suitable electrically conductive material such as, for example, brass having a nickel plating for corrosion resistance. Terminals 18, 19, may, for example, be of the screw type as shown in FIG. 1 or the quick connect and disconnect type or the solder type.

Included in the corners of housing 11 in each of the front and back portions 12, 14, are upper and lower raised portions 20, 23, respectively, which include apertures 21, 25, respectively, which extend through the thickness of housing 11 and receive suitable fastening means 22 such as, for example, rivets, screws, or the like, which retain the housing portions 12 and 14 in tightly engaged relation. On the upper end of the housing 11, as viewed in FIG. 1, is mounted a cover plate 24 which may be made of a material of suitable strength such as steel which has been nickel plated to provide corrosion resistance. A portion of each end of the cover 24 is struck out and bent to form tabs 26, 28, which, in the assembled state of housing 11, fit between each of the raised corner portions 20 of the housing portions adjacent the cover 24. The tabs 26, 28, include apertures 27 therein through which the fastening means 22 extend to retain the cover 24 in firmly assembled relationship with respect to the housing 11.

Mounted on the cover 24 is a manually operable toggle assembly generally indicated by reference numeral 30. Toggle assembly 30 includes a bushing 32 mounted in an aperture 31 in cover 24 and retained therein by having the portion of its end which protrudes through cover 24 rolled over as at 34. The remainder of the axial length of bushing 32 is threaded so as to receive in threaded engagement a locating washer 36, indicating plate 38, lock washer 40 and nut 42, in that order, from the cover up as seen in FIG. 1. Locating washer 36 has a bent portion 43 which may be received in a corresponding aperture in a mounting plate or panel (not shown) on which the switch 10 may be mounted. The indicating plate 38 includes the words "on" and "off" (not shown) printed on the upper surface of plate 38 to provide an indication of the condition of the circuit breaker 10. The nut 42 and lock washer 38 serve to retain the breaker 10 in tight fitting engagement with the mounting plate (not shown).

The toggle assembly 30 also includes a toggle 44 made of a formable, corrosion resistant material such as nickel plated brass, one end of which provides a handle and the other end of which takes the form of a bulb portion 48 having a generally spherical configuration and which is received in aperture 46 in bushing 32. The bulb portion 48 of toggle 44 includes a hollowed out portion or cavity 50 which receives in close fitting engagement, one end of a toggle link 52 formed of an insulating material such as, for example, nylon. Link 52 is retained in the bulb portion 48 of toggle 44 which in turn is retained in bushing 32 by means of a rivet or pin 54 which extends through the bushing, the bulb portion of the toggle and the toggle link. The toggle 44 and link 52 are pivotable about pin 54 between the FIG. 1 "on" position and the FIG. 5 "off" position, and are urged toward the "off" position as viewed in FIG. 5 by a helical extension spring 58 fastened at one end to an apertured tab 56 on link 52, and at its other end in aperture 21 of cover tab 26 as best seen in FIG. 1.

Since the toggle link 52 is formed of electrical insulating material, the toggle assembly 30 and cover 24, and hence the panel or device in which the circuit breaker 10 is mounted, are electrically insulated from the interior mechanism and circuit of the circuit breaker 10.

In cluded within the housing 11 are a frame member, generally indicated by reference numeral 60; a magnetic assembly supported by the frame member 60 and generally indicated by reference numeral 72; a rotatable armature-tripper member associated with the magnetic assembly 72 and generally indicated by reference numeral 94; a movable contact arm assembly mounted on the frame 60 in electrically conductive relationship with the magnetic assembly 72 and generally indicated at reference numeral 88, and a collapsible linkage assembly, attached at its lower end to the contact arm assembly 88 and at its upper end to the toggle assembly 30, generally indicated by reference numeral 122.

Figure 6:
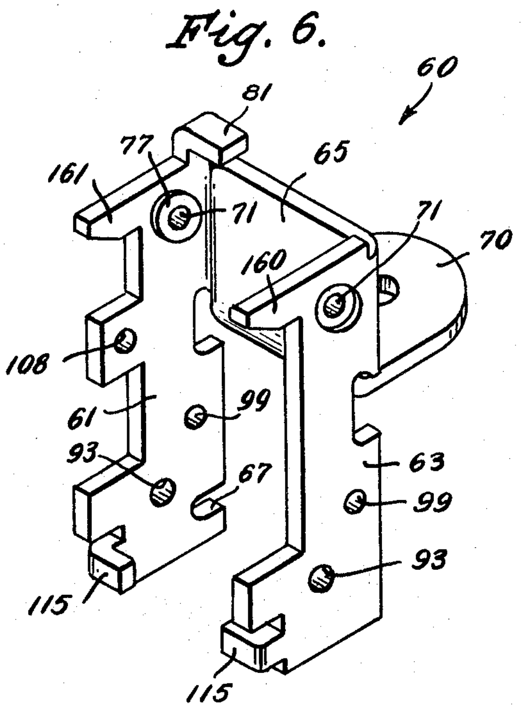
FIG. 6 is an enlarged perspective view of a frame member employed in the embodiment shown in FIG. 1.

As best seen in FIGS. 1, 2 and 6, the frame 60 is of single piece construction and includes a pair of leg portions 61 and 63 and a back portion 65 from the ends of which the legs 61 and 63 depend. Extending from the bottom of back member 65 is a support member 70 bent out of frame 60 on which is supported the magnetic assembly 72. The frame 60 is formed of a suitable magnetic corrosion resistant material such as nickel plated steel.

Frame member 60 is maintained in tight, fixed relationship within the housing 11 by means of pairs of raised abutments 62 and 64, one of each pair of which is formed on each of the housing portions 12, 14, and frictionally engages a side of one of the legs 61, 63, of frame 60. Additional restraint against movement is achieved through raised tabs 66 on each of the portions 12, 14, each of which abuts the upper portion of one of the leg portions 61, 63, of frame 60 as viewed in FIGS. 1 and 2, and by the surfaces 68 on the bottom portion of each of the housing portions 12 and 14, each of which abuts the lower portion of one of the frame legs 61, 63, as best seen in FIGS. 1 and 2. As best seen in FIGS. 1 and 6, a cutout portion 67 adjacent the bottom of leg 61 provides a degree of give in leg 63 and allows a force fit into the housing portion 14 between the tabs 62, 64, 66 and the bottom portions 68. In this manner, the frame 60 is retained in tight fitting engagement within the housing 11 and is not subject to vibrations or shocks to which the cover 24 or toggle assembly 30 might be subjected.

As best seen in FIG. 1, the magnetic assembly generally indicated by reference numeral 72 is mounted on frame support member 70 and includes a core 74, formed of a suitable magnetic material such as, for example, iron or steel, and a coil 76 of electrically conductive material such as copper, which is wound around the core 74 and insulated therefrom by a spool 78 formed of an electrical insulating material such as, for example, nylon or Teflon. The upper end of the core 74 (as viewed in FIG. 1) takes the form of a cap 75. The magnetic assembly 72 is electrically connected into a circuit through leads 80 and 82 formed by the three ends of coil 76. Lead 80 is electrically connected to terminal 19 while lead 82 is electrically connected to the contact arm assembly 88 through lead 82, connector 84, pigtail 86 and connector 87 as, for example, by welding, soldering or the like.

Figure 7:
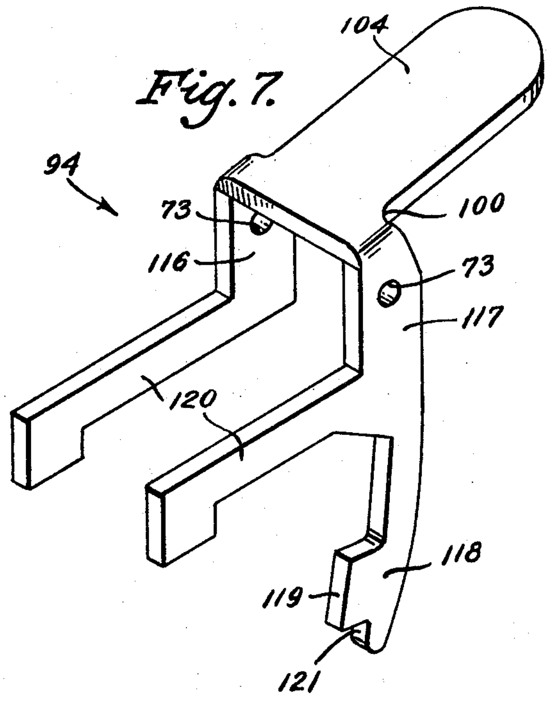
FIG. 7 is an enlarged perspective view of a balanced armature-tripper member employed in the embodiment shown in FIG. 1.

Associated with the magnetic assembly 72 is a rotatable member generally indicated by reference numeral 94, which is mounted on frame 60 for rotation about a pin 96 which extends through suitable apertures 71 in upper frame legs 61, 63, and through apertures 73 in rotatable member 94 (FIGS. 6 and 7). Rotation of member 94 in frame 60 is facilitated by raised bosses 77 which surround apertures 71 on frame 60 (FIG. 6). As best seen in FIG. 7, rotatable member 94 includes an armature leg 104 extending in a first direction. Extending in a second direction is a pair of legs 116, 117, from whose ends extend balancing extensions 120. Also extending from the end of leg 116 is a tripper extension portion 118 whose function will be explained in more detail below. It will be noted that tripper extension 118 extends generally in the same direction as the pair of legs 116, 117. Extensions 120 provide balance for the member 94 about pivot point 96 to minimize the effects on the operation of breaker 10 of forces applied to circuit breaker 10 externally of the housing 11. The electromagnetic forces developed by the magnetic assembly 72 attract the armature 104 and urge it to rotate in a clockwise direction as viewed in FIG. 1 about pin 96 towards engagement with cap 75.

Armature 104 and rotatable member 94 are urged to rotate in a counterclockwise direction as viewed in FIG. 1 by means of a torsion spring 98, one end of which bears against the assembly 94 at 100, and the other end of which is fixed in a slot 97 in pin 96. A stop against rotation in the counterclockwise direction for armature 104 is provided by a bent-over tab 81 formed on the top of frame 60. The position of tab 81 determines the air gap existing between armature 104 and magnetic assembly 72 in the position shown in FIG. 1. The tension exerted by spring 98 on rotatable member 94 is varied by rotation of pin 96 to set the amount of electromagnetic force required to rotate armature leg 104 toward magnetic assembly 72. When pin 96 has been rotated to the position at which the desired spring tension is achieved, pin 96 is retained in fixed position by spring 106 which is wound around one end of pin 96 and whose ends are retained in a suitable retaining aperture 108 in frame 60. The device is calibrated by positioning the tab 81 and tensioning the spring 98 to predetermine the electromagnetic force required to rotate member 94 including armature 104 toward engagement with cap 75 of magnetic assembly 72. In this manner only those current or voltage conditions in magnetic assembly 72 which are considered deleterious to the circuit or components to be protected will actuate armature 104.

The magnetic assembly 72 shown in FIG. 1 is of the so-called instantaneous acting type in that the electromagnetic force required to actuate armature 104 is built up in a relatively short time, e.g., on the order of a few milliseconds depending on the degree of overload. If it is desired that the circuit in which circuit breaker 10 is included remain uninterrupted under overload conditions of relatively short duration, the magnetic assembly 72 may be of the so-called time delay type in which the forces required to actuate armature 104 are slowly built up over a period of time which may be on the order of tenths of a second or seconds depending on the degree of overload. Such a time delay magnetic assembly may be provided by the use of a movable core carried in an oil-filled can, and spring biased away from the armature. In this manner, a period of time (the time delay) is required before the core moves to the armature end of the magnetic assembly where the electromagnetic force required to actuate armature 104 is developed.

Mounted on the lower portion of frame 60 as viewed in FIG. 1 is the contact arm assembly 88 which includes movable contact arm 90 which is electrically connected, as for example by welding, through connector 87, to the pigtail 86 leading from magnetic assembly 72. Contact arm 90, which is formed of a suitable electrically conductive material such as brass, also carries an electricallly conductive contact 91 electrically connected to arm 90, as for example, by welding and engageable with a fixed electrically conductive contact 92 carried by terminal 18.

Thus it can be seen that the completed electrical circuit through the breaker 10 is through terminal 18 to contact 92 to contact 91 through contact arm 90 to connector 87, pigtail 86, connector 84, to the coil lead end 82, through coil 76 to its other lead end 80, to terminal 19.

Contact arm 90 is provided with an elongated slot 112 and is mounted intermediate legs 61, 63, on frame 60 by a pin 110 which extends through apertures 93 in the frame legs and slot 112 on arm 90. Contact arm 90 is capable of limited sliding movement on pin 110 and of rotational movement about pin 110 in the plane of the drawing of FIG. 1.

Figure 4:
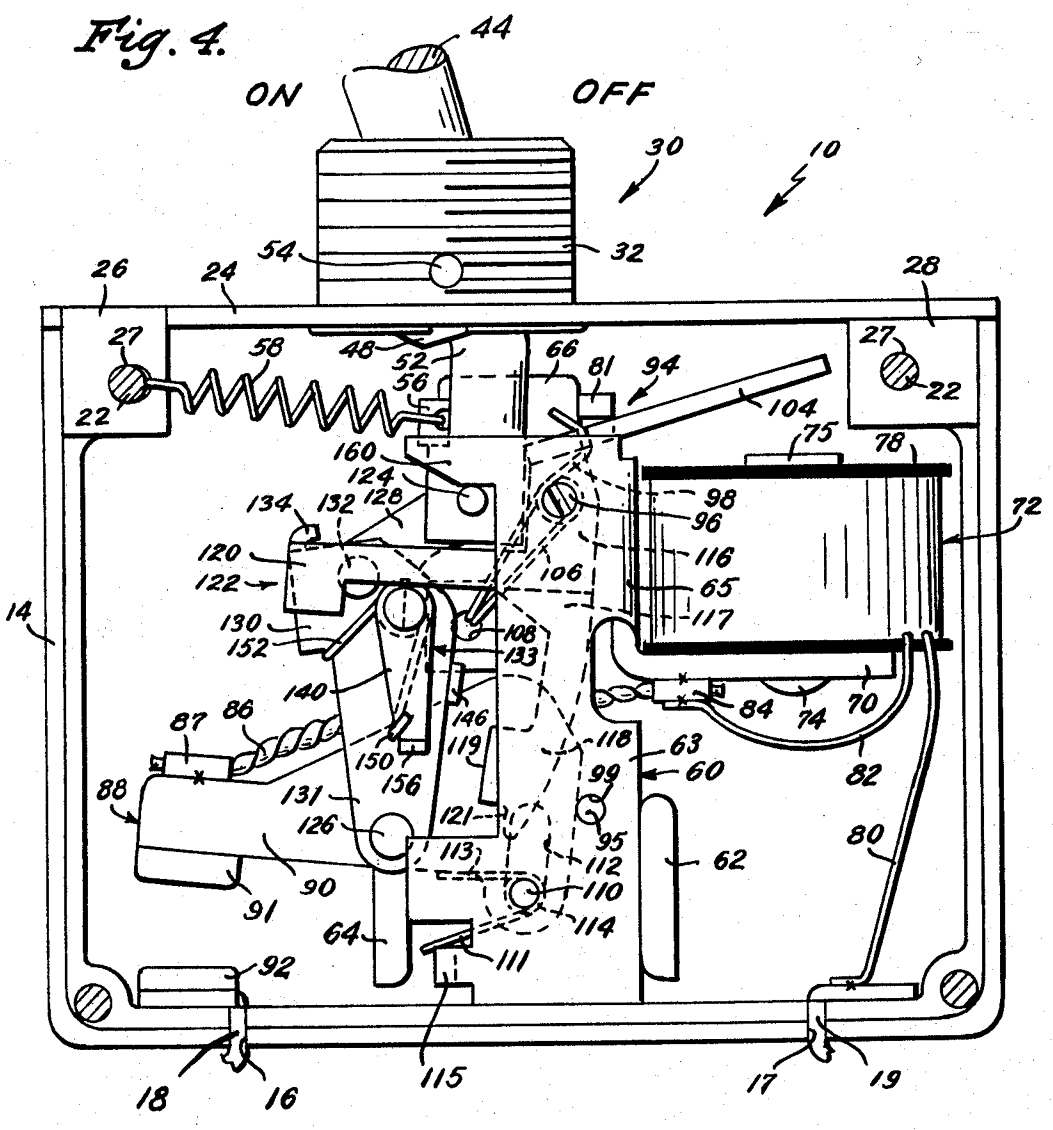
FIG. 4 is a view similar to FIG. 3 showing the device in the trip-free, contacts-open position.
Figure 5:
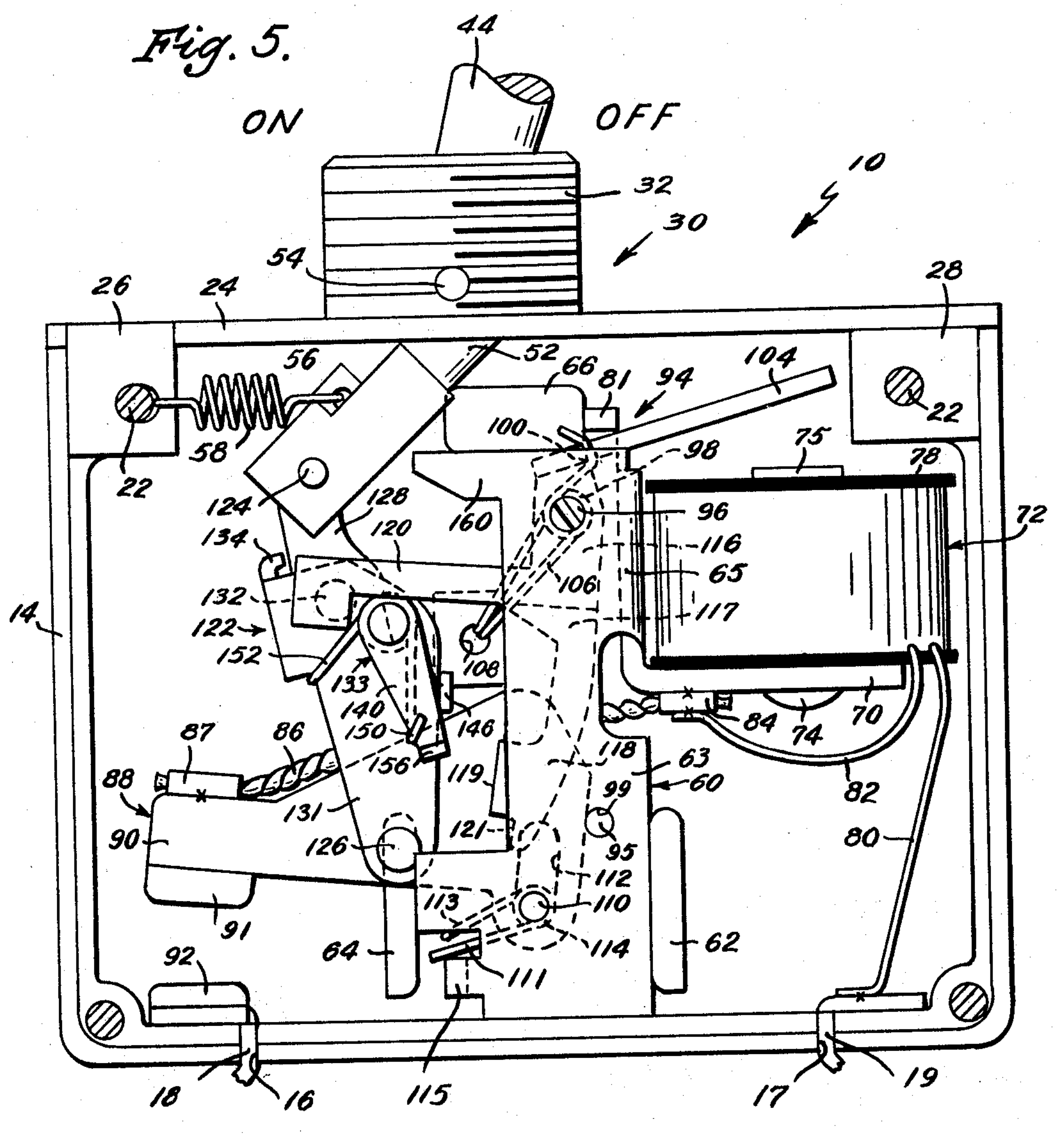
FIG. 5 is a view similar to FIG. 4 showing the device in the "off" or contacts-open position.

The arm 90 is urged towards rotation in a clockwise direction as viewed in FIG. 1 from the FIG. 1 contacts-closed position to the contacts-open position as viewed in FIGS. 4 and 5 by means of a double torsion spring 114, whose ends 111 bear against bent tab portions 115 extending from the bottom of frame legs 61, 63, and whose center portion 113 bears against the bottom of contact arm 90. A pin 95 is maintained in apertures 99 of frame legs 61, 63, to provide a stop for rotational movement of contact arm 90 in the clockwise direction about pin 110.

The contact arm assembly 88 is linked to the toggle assembly 30 by the collapsible linkage assembly 122. The assembly 122 includes a latch link 128 whose upper end (as viewed in FIGS. 1 and 2) fits loosely in a slot 53 in the lower portion of toggle link 52. Link 128 is connected to and is pivotable about link 52 at pin 124 which extends through the lower end of link 52 and the upper end of link 128. The lower end of latch link 128 fits loosely between the upper portions of the legs 131 of a center link 130 and is pivotally connected to link 130 by rivet 132 passing through the legs 131 and the link 128. At its lower end, the assembly 122 is linked to a contact arm assembly 88 by means of pin or rivet 126, which extends through center link legs 131 which straddle the contact arm 90, thereby providing a connection between contact arm 90 and center link 130.

As best seen in FIG. 1, the pivot point at rivet 132 is maintained to the left of a line passing through the centers of pins 124 and 126 by a tab portion 134 bent out of center link 130 and bearing against latch link 128. In this manner, it can be seen that if forces are applied at the ends of the linkage assembly 122, that is, at pins 126 and 124, the linkage assembly will tend to collapse to the left as viewed in FIG. 1. This collapse is prevented by a rotary latch mechanism generally indicated by reference numeral 133 which provides a stop against rotational movement by the latch link in a clockwise direction about pin 132.

Figures 8, 9:
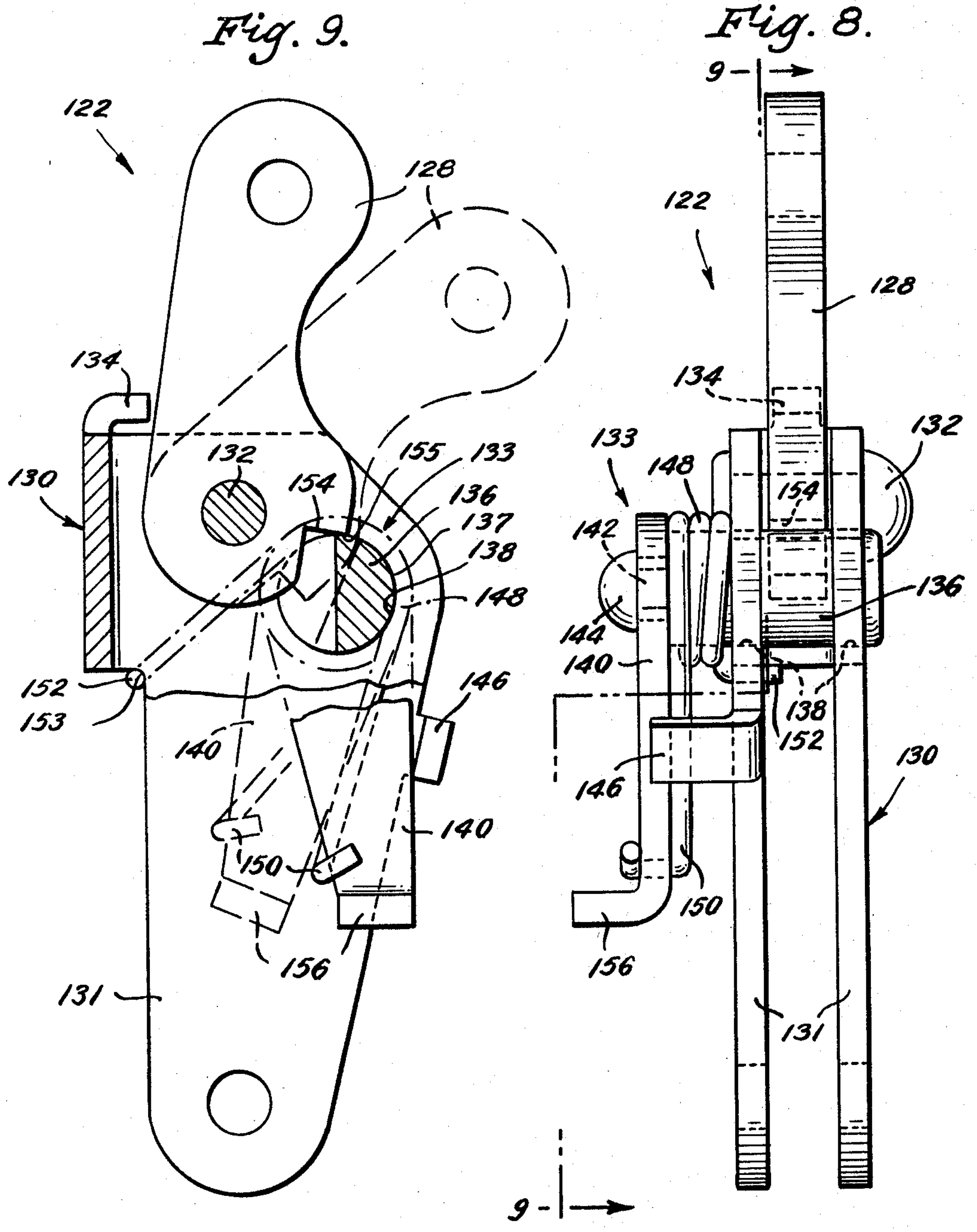
FIG. 8 is an enlarged elevational view taken from the rear of FIG. 2 of a collapsible linkage assembly according to the instant invention.
FIG. 9 is a sectional view taken on line 9—9 of FIG. 8.

As best seen in FIGS. 8 and 9 rotary latch 133 includes a latch barrel 136 which extends through and is pivotally received in a suitable aperture 138 located in the legs 131 of center link 130 and displaced from pivot point 132. Mounted on a necked-down end 142 of barrel 136 is a trip lever 140 which is retained on end 142 by a riveted over portion 144. The trip lever is restrained from rotation relative to barrel 136 by the non-circular shape or configuration, in cross section, of end 142 which when inserted in a similarly shaped aperture in tripper 140, retains tripper 140 against rotation in relation to the latch barrel 136. Alternatively, the end 142 may be circular in cross section and fitted into an aperture in tripper 140 in tight frictional engagement to thereby prevent relative rotation of lever 140 and barrel 136.

The center link 130 includes a bent over tab portion 146 which provides a stop for lever 140. The tripper is urged against stop 146 by means of a torsion spring 148, one of whose ends, 150, bears against the lower portion of the tripper 140 and the other of whose ends 152 bears against a stop portion 153 on the center link 130. Tripper 140 also includes, at its lower end as viewed in FIG. 9, a bent out tab portion 156 which, as best seen in FIGS. 1 and 2, is engageable with the tripper extension 118 of a rotatable member 94 when armature 104 is actuated by magnetic assembly 72.

As best seen in FIG. 9, latch link 128 has a cut out portion 154 which, in the latched solid-line position shown in FIG. 9, abuts the surface of latch barrel 136 at 155. This abutment retains the linkage assembly 122 in the substantially fixed position shown in FIG. 1 and in the solid-line portion of FIG. 9 in which position linkage 122 acts substantially as a rigid body. As can be seen in FIGS. 8 and 9, the portion of barrel 136 intermediate the legs 131 of center link 130 is cut out to form a half moon section 137 as viewed in cross section in FIG. 9. When tripper 140 is in the dotted-line position shown in FIG. 9, surface portion 155 of latch barrel 136 no longer abuts surface 154 of link 128. Thus link 128 is free to rotate about pin 132 to the dashed-line position shown in FIG. 9. It will be noted that since a portion of link 128 is always present in the cut out portion of barrel 136, a self-locking assembly of link 128, center link 130 and assembly 133 is achieved.

The operation of the device is as follows: The circuit breaker 10 is electrically connected into the circuit or component to be protected at the terminals 18 and 19. Previously the device has been calibrated by bending frame stop 81 to set the air gap between armature 104 and cap 75 of magnetic assembly 72, and by turning screw 96 to tension spring 98 to set or predetermine the amount of electromagnetic force required to actuate armature 104. This calibration determines the amount of overload required to actuate the armature and interrupt the circuit through the circuit breaker 10 at contacts 91, 92.

The toggle 44 is switched to the "on" or contacts-closed position as shown in FIG. 1. In normal operation, while in this condition, the linkage assembly 122 acts as a rigid body since it is in the latched position shown in the solid-line portions of FIG. 9. At this point, the spring 114 everts a force on the contact arm 90 tending to rotate it about pin 126 in a counterclockwise direction as viewed in FIG. 1. This creates a moment of force exerted on the contact arm 90 about pivot 126 by the engagement between contact 91 and stationary contact 92. The resultant is a force exerted on the linkage assembly 122 at pivot point 126, in an upward direction as viewed in FIG. 1. Since, as noted, the linkage in this condition acts as a rigid body equal and opposite forces exist upon the opposite end of linkage 122 at pivot point 124. The force exerted in an upward direction as viewed in FIG. 1 acts on the toggle link 52 at pivot point 124 and tends to retain the toggle 44 in the "on" position since there is a component of force acting on link 52 at point 124 in a direction to the right of toggle point 54 as viewed in FIG. 1. An opposing force is exerted on the linkage 122 at point 124 in the downward direction as viewed in FIG. 1.

As can be seen in FIGS. 1 and 2, pin 124 extends outwardly away from both sides of toggle link 52 and abuts extensions 160, 161, which project from frame legs 61, 63, respectively, to form a stop for pin 124. In this manner the force exerted at pin 124 in the upward direction is absorbed by the frame 60. In this manner, the forces acting in the downward direction on linkage 122 at pin 124 are not disturbed by vibration or shock to which the movement of the cover 24 or toggle assembly 30 might be subjected. Thus the force acting downwardly on contact arm 90 at 126 and hence the force acting to maintain engagement of contacts 91 and 92 are maintained substantially constant. This advantageously protects the device against a source of contact chatter by effectively insulating the contacts, when in the engaged position, from cover or toggle movement.

Figure 3:
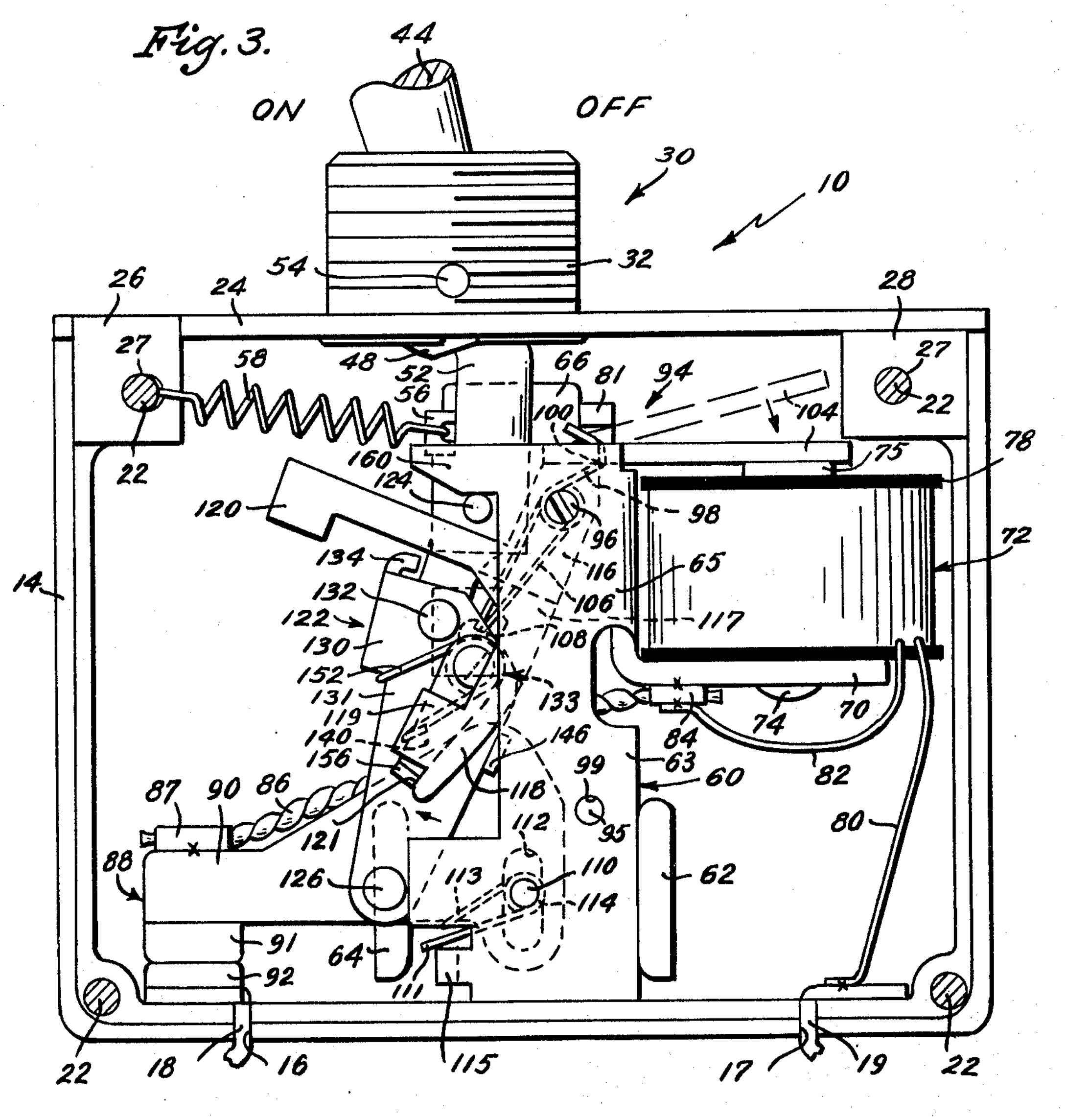
FIG. 3 is an enlarged view similar to FIG. 1 with portions of the device omitted for clarity of illustration and showing the assembly in a condition just prior to tripping or opening of the contacts.

When an overload condition (as determined by the calibrated setting of tab 81 and spring 98) appears in the circuit into which the circuit breaker is connected and which it is desired to protect, it is transmitted through the circuit from terminal 18 to magnetic assembly 72 and through the coil 76 whereupon electromagnetic forces are generated in the magnetic assembly 72 which are sufficient to attract armature 104 toward cap 75. Member 94, including armature 104, rotates about pin 96 in a clockwise direction as viewed in FIG. 1 against spring 98 such that armature 104 moves to the solid-line position shown in FIG. 3 and tripper extension 118 engages tab 156 on tripper 140 and urges lever 140 to rotate in a clockwise direction as viewed in FIGS. 1, 3 and 9 to the dashed-line position shown in FIG. 9. As this occurs, the half moon portion 137 of the rotary latch moves to the dashed-line position shown in FIG. 9 and releases link 128 to unlatch linkage 122. Since no forces are now acting at the rotary latch 133, center link 130 is subject to the force of spring 114 acting upwardly at pin 126. Because of the off-center position of pivot 132 relative to pivots 124 and 126, the assembly 122 collapses to the left to the position shown in FIGS. 4 and 5. Since the linkage assembly 122 no longer acts as a rigid body there is no longer a component of force exerted downwardly on contact arm 90 at pin 126 and contact arm 90 is free to move under the action of spring 114, upward to the end of slot 112 and thereafter to rotate about pin 110 to the contacts-open position shown in FIGS. 4 and 5. It is prevented from further rotation by the stop 95 on frame 60. This interrupts the circuit through the coil 76 thus removing the electromagnetic forces acting on armature 104 which then returns to the position shown in FIGS. 1, 4 and 5 under the action of spring 98.

FIG. 4 shows the operation of the device in the trip-free condition, that is, when the toggle switch 44 is held in the "on" position. It can be seen that the contacts 91 and 92 will disengage even though the switch is held in the "on" position, since the collapse of the linkage assembly 122 and the pivoting of contact arm 90 about pivot pin 110 is effected by the force of spring 114 acting on the unlatched linkage 122 and is not dependent on the toggle position, unlatching of rotary latch 133 takes place. If the toggle is then released to the action of spring 58, it pivots about pin 54 to the "off" position shown in FIG. 5. As this occurs, toggle link 52 moves to the position shown in FIG. 5 thus returning linkage assembly 122 to the solid-line position shown in FIG. 9. This allows half moon portion 137 of latch barrel 136, and consequently trip lever 140 acting under the action of spring 148, to return to the full-line position shown in FIG. 9, thus relatching linkage assembly 122 so that thereafter it may act as a rigid body.

It can be seen that since contact arm 90 is retained in the contacts-open position by the action of spring 114, the circuit will not be reclosed until toggle 44 is manually moved to the "on" position. When this is done, toggle link 52 moves across and downwardly and exerts a component of force in the downward direction on the linkage 122 at pivot 124. Since the latched linkage 122 acts as a rigid body, a component of force in the downward direction is exerted on contact arm 90 at pin 126. This is opposed by the force of spring 114 which exerts a moment of force on arm 90 about pin 110 until contacts 91 and 92 are in engagement. As the contacts 91, 92, engage, the pivot point of arm 90 is transferred from pin 110 to a pivot about the point of engagement of contacts 91 and 92. Arm 90 pivots about the contacts 91, 92, until slot 112 moves down on pin 110 of arm 90 until arm 90 assumes an equilibrium state under the action of the forces exerted at end 115 of spring 114, at contacts 91, 92, and at pivot pin 126. Thereafter, spring 114 exerts a moment of force about pivot 126 to maintain contacts 91 and 92 in engagement.

It may occur that the circuit breaker 10 is closed on an existing overload condition. Since engagement of contacts 91 and 92 occurs before toggle assembly 30 has completed its movement from the FIG. 5 "off" position to the FIG. 1 "on" position, rotary latch 133 is not aligned with tripper extension 118 so that the latch can be actuated by the lower or cam portion 121 of extension 118 as in the normal case as shown and described in connection with FIG. 3. In such a case, the circuit to be protected could be subjected to undesirable overloads during the interval of time when the toggle assembly 30 and linkage assembly 122 were moved to the "on" position of FIG. 1. To avoid this problem, extension 118 includes a second cam portion 119 shaped to follow the motion of trip lever tab 156 so that the rotary latch 133 can be actuated to effect contact disengagement during the movement of assemblies 30 and 122 to the "on" position of FIG. 1.

Figure 10:
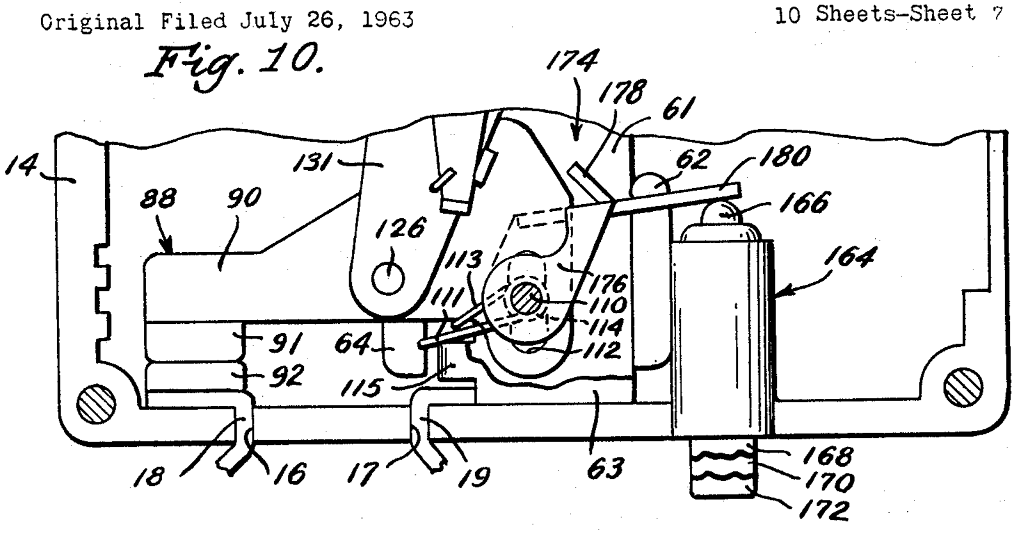
FIG. 10 is an enlarged fragmentary, elevational view with the front portion of the housing removed for clarity of illustration of a second embodiment of the instant invention in which the magnetic circuit breaker assembly includes an auxiliary switch which is shown in a non-actuated condition.
Figure 11:
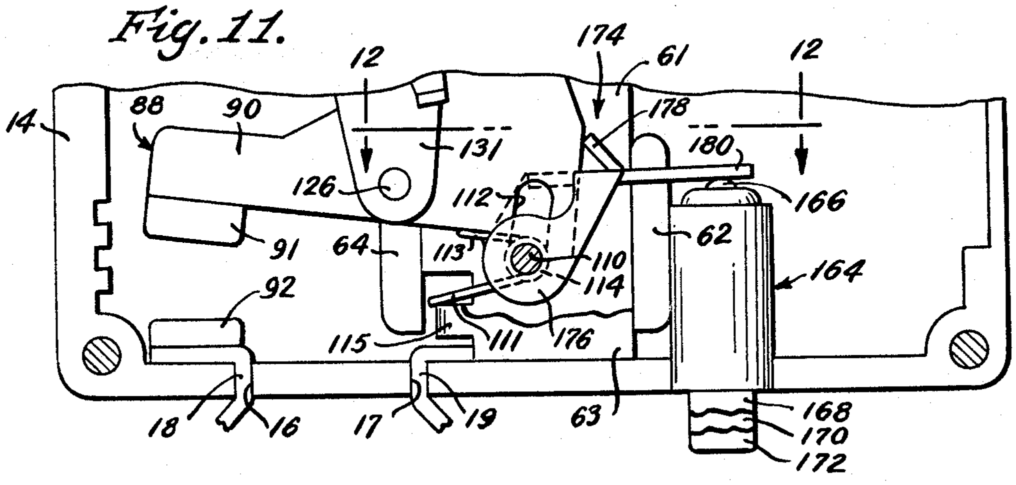
FIG. 11 is a view similar to FIG. 10 showing the primary circuit breaker contacts in the contacts-open position and the auxiliary switch in the actuated condition.
Figure 12:
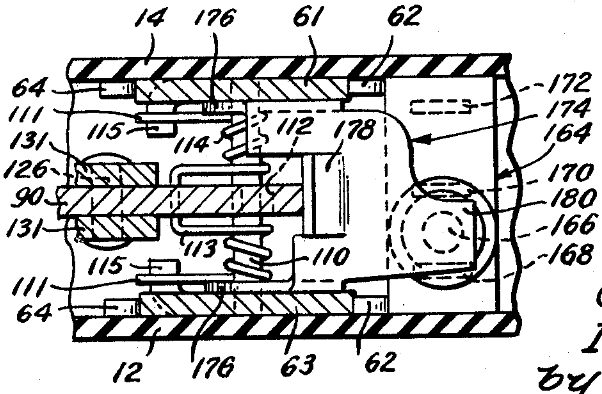
FIG. 12 is a sectional, fragmentary view taken along line 12—12 of FIG. 11.

A second embodiment of the instant invention is illustrated in FIGS. 10, 11 and 12. In this embodiment, the magnetic circuit breaker 10 is modified to include an auxiliary electrical switch generally indicated by reference numeral 164, which may be of any desired mechanically actuated type. In the exemplary form shown in FIG. 10, switch 164 includes a push button 166 which, when depressed, actuates switch 164. Switch 164 is mounted and retained in housing 11 so that its electrically conductive terminals 168, 170 and 172 extend outwardly for connection in external circuit. A mechanical actuator, generally indicated by reference numeral 174 includes on one end, leg portions 176 having apertures therein for mounting the actuator 174 for rotation about pin 110. In this embodiment, contact arm stop pin 95 is replaced by a bent tab portion 178 struck out of actuator 174 and located adjacent the back portion of contact arm 90 for abutting engagement therewith. On the other end of actuator 178 from legs 176 is located a tab portion 180 which rests on the push button 166 of switch 164 which, in the normal contacts-closed or unactuated position shown in FIG. 10, is in its uppermost position.

When an overload condition occurs which is sufficient to actuate the circuit breaker 10 as described in connection with FIGS. 1–9, contact arm 90, under the action of spring 114 moves to the bottom of slot 112 and rotates about pin 110 in the clockwise direction as viewed in FIG. 10 to the contacts-open position shown in FIG. 11. As this movement occurs, contact arm 90 engages tab 178 and urges actuator 174 toward rotation in the clockwise direction. This causes extension 180 to depress push button 166 to actuate switch 164. In this manner an overload condition in a primary circuit is sensed and the circuit breaker 10 is actuated to open that circuit. This opening movement is sensed by the actuator 174 and is transferred to pushbutton 166 to actuate auxiliary switch 164.

It will be noted that the construction of this embodiment is such that the forces required to actuate auxiliary switch 164 do not decrease the forces maintaining contacts 91 and 92 in engagement. Advantageously, this arrangement permits actuation of the auxiliary switch in response to actuation of the primary circuit breaker contacts 91, 92 without deleteriously affecting the contact pressure therebetween when the latter are in the contacts-closed condition, e.g., as seen in FIGS. 1 and 10.

An exemplary embodiment of a third modification of the instant invention is illustrated in FIGS. 13–17.

Figure 13:
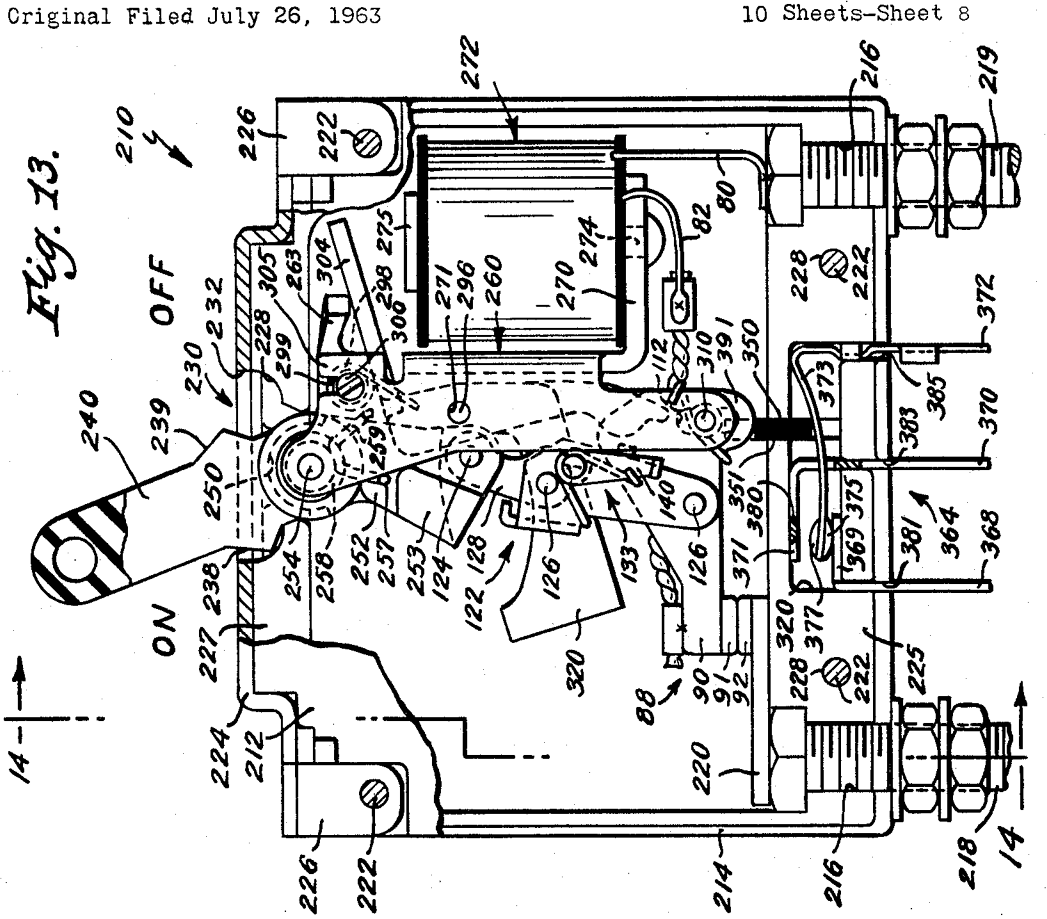
FIG. 13 is an elevational view of a third embodiment of the instant invention with portions of the housing fragmented, and showing the circuit breaker primary contacts in the normal "on" or contacts-closed position.
Figure 14:
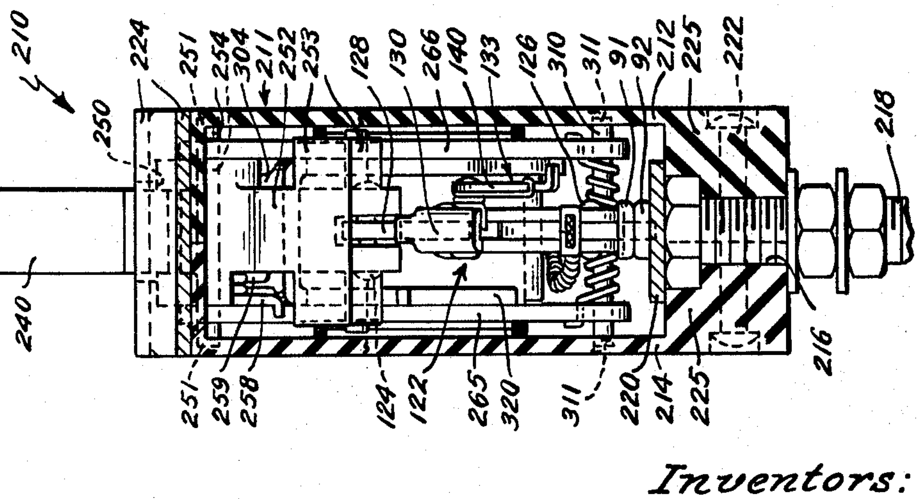
FIG. 14 is a sectional view taken on line 14—14 of FIG. 13.

Referring more particularly to FIGS. 13 and 14, an exemplary circuit breaker, generally indicated by reference numeral 210, includes a housing generally indicated by a reference numeral 211 having a front portion 212 and a bottom portion 214 formed of a suitable insulating material such as, for example, an arc-resistant, moldable, phenolic, resinous material. Housing 211 also contains suitable openings 216 for mounting therein terminals 218 and 219 which may be similar to terminals 18, 19, and made of a suitable electrically conductive material. On one of the terminals 218 is connected an electrically conductive contact plate 220 to which is connected the electrical contact 92 by connections providing good electrical conductivity as, for example, by welding.

Each of the housing portions 212, 214, include upper and lower raised end portions 225, 227, which extend the width of housing 211. The raised portions 225, 227, include apertures 228, passing therethrough for receiving fasteners 222, which may be of screws, rivets or the like, and which retain the housing portions in tight fitting engagement. Mounted on the top of housing 211 is a cover member 224 having tab portions 226 which bracket the housing 211 and through which the fasteners 222 pass to retain the cover on housing 211.

The circuit breaker 210 also includes a toggle assembly generally indicated by reference numeral 230 which includes a one-piece toggle handle 240 and toggle link 252 formed of a suitable electrical insulating material such as, for example, an arc-resistant, moldable, phenolic, resinous material. Raised portion 227 is recessed at 228 to receive toggle unit 240, 252. The cover 224 includes an opening 232 through which toggle handle 240 projects and which is of a size sufficient to allow movement of the toggle handle between the "on" position shown in FIG. 13 and the "off" position shown in FIG. 15. Cover opening 232 is also sufficiently large to allow one to view the surfaces 238, 239, on handle 240 on which are printed the words "on" and "off" respectively.

Toggle 240 and toggle link 252 are pivotable as a unit about a toggle pin 254 passing through an aperture in the toggle unit 240, 252, and through apertures 255 in the frame member generally indicated by reference numeral 260. A portion of the toggle unit 240, 252, surrounding the pin 254 is hollowed out to provide a housing 250 for a toggle spring 258, one of whose ends 257 abuts a portion of the frame 260 at 267 and the other of whose ends 259 abuts a portion of the toggle link 252 to urge the toggle to the "off" position shown in FIG. 15. Toggle link 252 includes a raised portion 253 which abuts the frame 260 at 261 to provide a stop for the toggle 240 when it is in its "on" position as shown in FIG. 13.

Included within the housing 211 are the frame member generally indicated by numeral 260, a magnetic assembly generally indicated by reference numeral 272, an armature member associated with the magnetic assembly 272 and generally indicated by reference numeral 294, and a movable contact arm assembly, generally indicated by reference numeral 88 and mounted on the frame 260 in electrically conductive relationship with the magnetic assembly generally indicated by reference numeral 272, and a collapsible linkage assembly, generally indicated by reference numeral 122, and attached at one end to the contact arm assembly 88 and at the other end to the toggle assembly 230.

Figure 16:
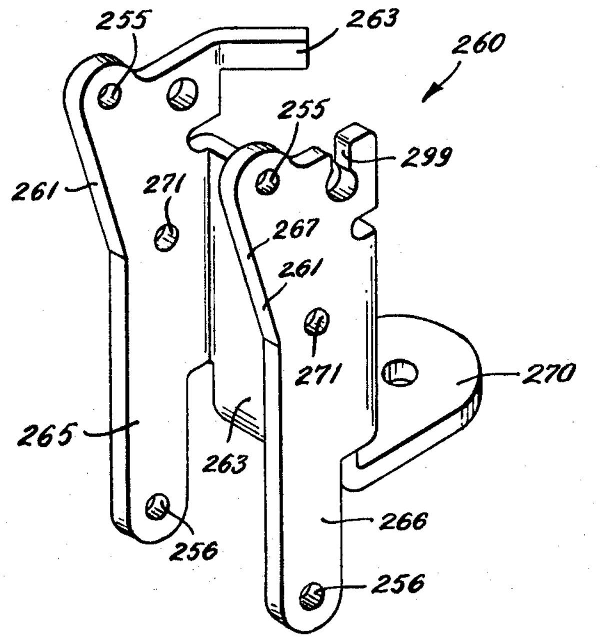
FIG. 16 is an enlarged perspective view of a frame member employed in the embodiment shown in FIG. 13.

As best seen in FIGS. 13, 14 and 16, the frame 260 is of single piece construction and includes a pair of leg portions 265 and 266 and a back portion 265 from the ends of which the legs 265 and 266 depend. Extending from the bottom of back member 265 is a support member 270 on which is supported the magnetic assembly 272. The frame 260 is formed of a suitable corrosion-resistant magnetic material such as nickel plated steel.

The frame 260 is retained in fixed relationship within the housing 211 by means of pin 254 which extends through apertures 255 in the upper portions of frame legs 265, 266, into anchoring recesses 251 in housing 211. The lower end of frame 260 is similarly anchored by pin 310 which extends through apertures 256 in the lower portion of frame legs 265, 266, into anchoring recesses 311 in housing 211.

The frame 260 also mounts on support member 270 a magnetic assembly 272 which may be of the type described in connection with circuit breaker 10. However, since in actual use circuit breaker 210 may operate at higher current and voltage conditions than circuit breaker 10, the assembly 272, when used in circuit breaker 210 is preferably of larger capacity.

Figure 17:
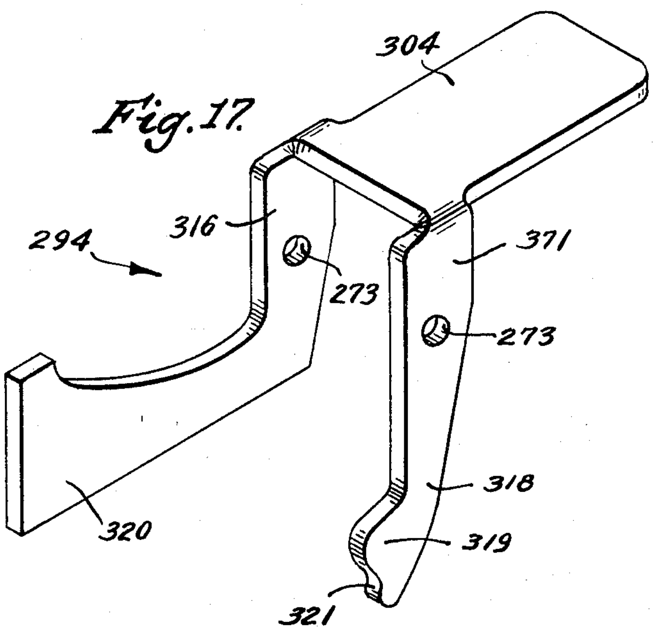
FIG. 17 is an enlarged perspective view of a balanced armature-tripper member employed in the embodiment shown in FIG. 13.

Associated with assembly 272 is a rotatable member 294 which is mounted on frame 260 for rotation about a pin 296 passing through apertures 271 in frame legs 265, 266, and apertures 273 in member 294 (FIGS. 16 and 17). Rotation of member 294 on pivot pin 296 in frame 260 is facilitated by washers (not shown) on pin 294 between member 294 and frame legs 265, 266, formed of a suitable material such as, for example, Teflon. As best seen in FIG. 17, rotatable member 294 includes an armature portion 304 extending in a first direction and extending in a second direction, a pair of legs 316, 317. A balancing extension 320, which performs the same function as the balancing extension 120 described in connection with FIG. 7, extends from the end of leg 316. Extending from the end of leg 317, in generally the same direction as the legs 316, 317, is a tripper extension 318 including first and second cam surfaces 321 and 319 similar to the extension 118 and surfaces 121 and 119 described in connection with circuit breaker 10. The electromagnetic forces developed by magnetic assembly 272 attract armature 304 and urge it to rotate in a clockwise direction as viewed in FIG. 13 about pin 296 towards engagement with magnetic cap 275 on the upper end of magnetic core 274.

Armature 304 and member 294 are urged to rotate in a counterclockwise direction as viewed in FIG. 13, into engagement with bent over tab portion 263 on frame 260, which acts as a calibrated stop for armature 304 in the same manner as stop 81 in circuit breaker 10, by a spring 298 wound on a slotted pin 300, carried by the frame 260. One end of pin 300 rests in a slot 299 and, when pin 300 has been rotated to tension spring 298 to the required point (in the manner of pin 96 and spring 98 for circuit breaker 10), the tab 305 is bent to reduce the size of slot 299 thus securing pin 300 against rotation and securing spring 298 in calibrated position.

As in circuit breaker 10, a collapsible linkage assembly 122 is pivotally connected at its lower end to contact arm 90 of contact arm assembly 88 by a pivot pin 126 which extends through contact arm 90 and center link 130. At its upper end, assembly 122 is pivotally connected to toggle assembly 230 by a riveted over pin 324 passing through the lower end of toggle link 252 and the upper end of link 128. The contact arm assembly 88 is electrically connected to magnetic assembly 272 in the same manner as in circuit breaker 10 and is pivotally mounted in frame 260 by pin 310 which passes through slot 112 in contact arm 90 and frame apertures 256.

Housing 211 has a hollowed out portion 320 in raised end portion 225 for housing an auxiliary switch generally indicated by reference numeral 364. Switch 364 includes terminals 368, 370 and 372 formed of a suitable electrically conductive material and frictionally retained in apertures 381, 383 and 385 in housing 211. Terminals 368 and 370 are frictionally retained in their respective apertures 381, 383 and include at their inner ends, electrical contact portions 369 and 371. Terminal 372 is formed of a flexible resilient material and includes an arm 373 having electrical contacts 375, 377, electrically connected thereto, and arranged for engagement with fixed contact portions 369 and 371, respectively. Terminal 372 is retained in aperture 385 by spring tabs 374. Terminal 370 has a slot shaped aperture 380 through which arm 373 passes and in which the arm 373 moves from the position shown in FIG. 13 to the position shown in FIG. 15. As best seen in FIG. 13, bottom portion 391 of contact arm 90 abuts an actuating member 350 formed of a suitable insulating material. Actuator 350 is slidably retained in a slot 351 leading into hollowed out portion 320 of housing 211 and is in abutting engagement with arm 373.

The operation of the device is as follows: The circuit breaker 210 is connected into the circuit or component to be protected at terminals 218 and 219. Previously the device has been calibrated by bending tab 263 and tensioning spring 298 to fix the amount of electromagnetic force required to actuate armature arm 104 and hence to determine the amount of overload required to actuate the armature, as described in connection with circuit breaker 10.

The toggle 240 is switched to the "on" or contacts-closed position as shown in FIG. 1. As in the case of circuit breaker 10, in normal operation in the closed position the linkage assembly 122 acts as a rigid body since it is in the latched position shown in the solid-line portions of FIG. 9. In addition, the spring 114 exerts a force on the contact arm 90 tending to rotate it about pin 126 in a counterclockwise direction as viewed in FIG. 13 to urge movable contact 91 into engagement with stationary contact 92 as described in connection with circuit breaker 10. In addition lower contact arm surface 391 is in its lowermost position as shown in FIG. 13 since slot 112 has moved down about pin 310 and contacts 369 and 375 are in engagement.

Since the frame 260 is secured in casing 211 by pins 254 and 310, thereby isolating the frame 260 from vibration of cover 224, the force exerted at toggle pivot 254 is absorbed by the frame 260 and is not disturbed by vibration or shocks affecting the cover 224 or the toggle handle assembly 230. This preserves constant the resultant force acting on contact arm 90 and hence the force acting to maintain contacts 91 and 92 in engagement as in the case of circuit breaker 10. This advantageously protects the device against a source of contact chatter by insulating the electrical contacts from cover or toggle movement.

Figure 15:
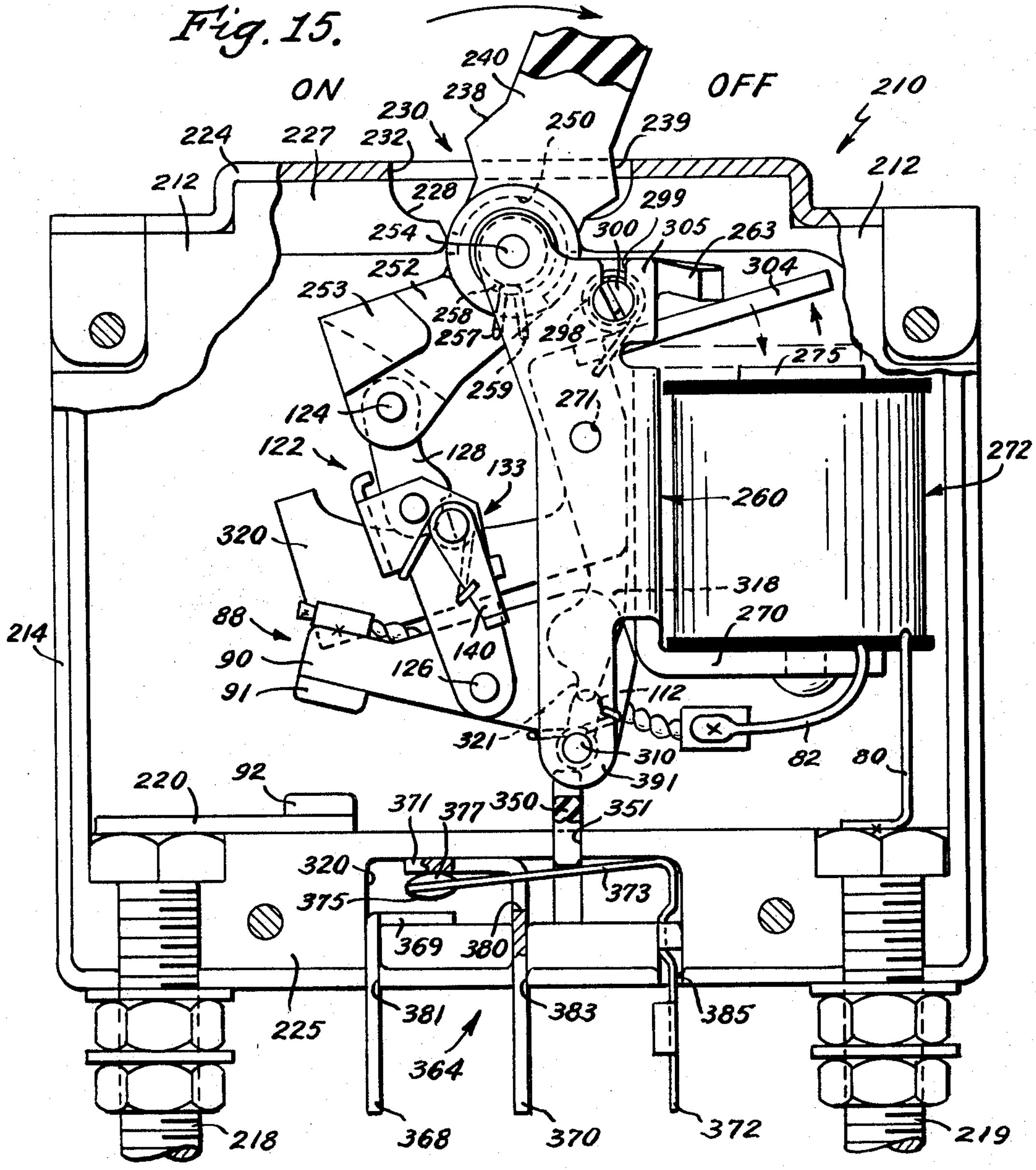
FIG. 15 is an enlarged view similar to FIG. 13 with portions of the device omitted for clarity of illustration and showing the primary circuit breaker contacts in the contacts-open or "off" position.

When an overload condition as determined by the setting of tab 263 and spring 298 occurs in the circuit through magnetic assembly 272, armature 304 is actuated and moves tripper extension 318 and surface 321 to engage tripper 140 and unlatch rotary latch 133 thereby allowing linkage 122 to collapse to the left as shown in FIG. 15 and as described in connection with the operation of circuit breaker 10.

When linkage 122 collapses, contact arm 90, acting under the force of spring 114 moves to the contacts-open position shown in FIG. 15. As this occurs contact arm surface 391 moves upwardly from the FIG. 13 position to the FIG. 15 position as slot 112 moves upwards, thereby releasing actuator 350 to the action of spring arm 373 which moves to the position shown in FIG. 15 in which contacts 377 and 371 are in engagement.

If toggle 240 is held in the "open" position as shown in FIG. 13, the trip-free operation described in connection with FIG. 4 will occur since as in circuit breaker 10 the collapse of linkage 122 is not dependent on the position of toggle 240.

It can be seen that since contact arm 90 is retained in the contacts-open position by spring 114, the circuit will not be reclosed until toggle handle 240 is manually moved to the "on" position. When this is done, the same sequence of events described in connection with circuit breaker 10 occurs and contacts 91 and 92 are engaged. Contact arm surface 391 engages actuator 350 to urge it in a downward direction, as viewed in FIGS. 13 and 15 against spring arm 373, thereby disengaging contacts 371 and 377 and re-engaging contacts 369 and 377 of auxiliary switch 364. At this point the circuit breaker 210 is ready to sense another overload condition.

The same protection against closing in an overload condition described in connection with circuit breaker 10 is afforded by tripper extension 318, cam surfaces 321 and 319 which will engage tripper 140 in either the closed position of breaker 210 or while it is being moved to that position after contacts 91 and 92 are in engagement.

It should be noted that circuit breakers 10 and 210 may be provided with several alternative circuit paths and terminal arrangements. For example, a third terminal may be electrically connected to the electrical path between the end 82 of the coil and the contact assembly 88 to allow either current or voltage overload sensing. Alternatively, the electrical connection between the coil and the contact arm assembly may be deleted. In this modification, the coil ends 80 and 82 are electrically connected to a first pair of terminals while the contact arm 94 and fixed contact 92 are electrically connected to a second pair of terminals. In this manner, an overload condition may be sensed in one circuit to interrupt a second circuit.

It will be noted that circuit breaker 210 may be constructed and employed without the auxiliary switch 364 in a manner similar to that described in connection with the embodiment shown in FIGS. 1–9.

It will be noted that, as in the case of the device shown in FIG. 10, the forces required to actuate auxiliary switch 364 do not decrease the forces maintaining contacts 91 and 92 in engagement to provide advantages similar to those described above for the embodiment of FIGS. 10–12.

Finally, in all of the embodiments described herein, an aperture (not shown) may be provided in the housing to provide access to the pin 96, 300 carrying the spring 98, 298, biasing the rotatable armature tripper 94, 294, away from the magnetic assembly 72, 272, thus permitting external calibration of the circuit breaker.

In view of the above it will be seen that the several objects of the invention are achieved and other advantageous results are obtained.

It is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A circuit breaker comprising a housing; first and second electrical contacts mounted in said housing; a movable arm mounting one of said contacts for movement into and out of engagement with the other of said contacts for controlling a first electrical circuit; magnetic means for moving said movable arm to effect actuation of said first and second contacts under predetermined conditions; an auxiliary switch mounted in said housing for controlling a second electrical circuit including third and fourth electrical contacts, one of which is movable into and out of engagement with the other of said third and fourth contacts to effect actuation thereof; enclosure means molded in said housing to form a casing for said auxiliary switch, said enclosure means having apertures formed therein; said auxiliary switch including terminal members mounting said third and fourth contacts, and frictionally retained in said apertures; means including a mechanical linkage comprising an actuating member loosely retained in a guideway formed in said enclosure, said actuating member being engageable with said movable arm and said movable one of said third and fourth electrical contacts for effecting actuation of said third and fourth electrical contacts in response to movement of said movable arm.

2. A device as set forth in claim 1 wherein said actuating member and said enclosure are formed of an electrical insulating material to electrically insulate said auxiliary switch from said first and second contacts.

3. A circuit breaker comprising a housing; first and second electrical contacts mounted in said housing; a movable arm mounting one of said contacts for movement into and out of engagement with the other of said contacts to effect actuation thereof; a linkage assembly connected with said movable arm, said linkage being movable to a collapsed position to effect said contact actuation; magnetic means in said housing; a rotatable member movable in response to said magnetic means, said rotatable member including a first leg extending in a first direction to form an armature associated with said magnetic means, second and third legs, extending in one direction, a balance member extending from the end of one of said second and third legs, a trip member extending in said second direction from the end of one of said second and third legs, said trip member being engageable with said linkage assembly for moving said linkage assembly to said collapsed position to move said movable arm; an auxiliary switch mounted in said housing for controlling a second electrical circuit including third and fourth electrical contacts, one of which is movable into and out of engagement with the other of said third and fourth contacts to effect actuation thereof; enclosure means molded in said housing to form a casing for said auxiliary switch, said enclosure means having apertures formed therein; said auxiliary switch including terminal members mounting said third and fourth contacts, and frictionally retained in said apertures; means including a mechanical linkage comprising an actuating member loosely retained in a guideway formed in said enclosure, said actuating member being engageable with said movable arm and said movable one of said third and fourth electrical contacts for effecting actuation of said third and fourth electrical contacts in response to movement of said movable arm.

4. A circuit breaker comprising a housing; first and second electrical contacts mounted in said housing; a movable arm mounting one of said contacts for movement into and out of engagement with the other of said contacts to effect actuation thereof; a linkage assembly connected with said movable arm, said linkage being movable to a collapsed position to effect said contact actuation; magnetic means in said housing; a rotatable member movable in response to said magnetic means, said rotatable member including a first leg extending in a first direction to form an armature associated with said magnetic means, second and third legs, extending in one direction, a balance member extending from the end of one of said second and third legs, a trip member extending in said second direction from the end of one of said second and third legs, said trip member being engageable with said linkage assembly for moving said linkage assembly to said collapsed position to move said movable arm; an auxiliary switch mounted in said housing for controlling a second electrical circuit including third and fourth electrical contacts, one of which is movable into and out of engagement with the other of said third and fourth contacts to effect actuation thereof; enclosure means molded in said housing to form a casing for said auxiliary switch, said enclosure means having apertures formed therein; said auxiliary switch including terminal members mounting said third and fourth contacts, and frictionally retained in said apertures; means including a mechanical linkage comprising an actuating member loosely retained in a guideway formed in said enclosure, said actuating member being engageable with said movable arm and said movable one of said third and fourth electrical contacts for effecting actuation of said third and fourth electrical contacts in response to movement of said movable arm and frame means mounting said movable arm, said magnetic assembly and said rotatable member as a subassembly in said housing.

5. A device as set forth in claim 4 wherein said frame includes stop means formed on said frame for limiting the movement of said rotatable member.

6. A device as set forth in claim 5 where said rotatable member is urged into engagement with said stop and away from said magnetic means to set predetermined conditions under which said rotatable member will move in response to said magnetic means.

7. A device as set forth in claim 6 wherein said frame is retained in said housing by raised abutments molded in said housing, which abutments provide a firm frictional fit from said frame.

8. A device as set forth in claim 1 wherein said housing is formed of an electrical insulating material.

9. A device as set forth in claim 1 wherein said magnetic means is of the time delay type whereby predetermined conditions include only conditions persistent over a predetermined time interval.

10. A device as set forth in claim 7 wherein said housing is formed of an electrically insulating material.

11. A circuit breaker comprising a housing; first and second electrical contacts mounted in said housing; a movable arm mounting one of said contacts for movement into and out of engagement with the other of said contacts for controlling a first electrical circuit; magnetic means for moving said movable arm to effect actuation of said first and second contacts under predetermined conditions; a resilient spring urging said movable arm to rotate in a first direction towards engagement of said first and second contacts about a first pivot point when said first and second contacts are engaged and urging said movable arm to rotate in a second direction towards disengagement of said first and second contacts about a second pivot point when said first and second contacts are disengaged; an auxiliary switch mounted in said housing for controlling a second electrical circuit including third and fourth electrical contacts, one of which is movable into and out of engagement with the other of said third and fourth contacts to effect actuation thereof; said movable one of said third and fourth contacts being mounted on a resilient arm for biasing said third and fourth contacts into engagement; means including a mechanical linkage connected between said movable arm and said movable one of said third and fourth electrical contacts for effecting actuation of said third and fourth electrical contacts in response to movement of said movable arm in said second direction.

12. A circuit breaker comprising a frame mechanism embodying a substantially U-shaped frame having a back portion and a pair of legs extending from said back portion, an arm movably mounted on said frame, said arm supporting a movable contact, and magnetic means mounted on said frame for moving said arm under predetermined conditions; a housing assembly embodying a pair of insulating shells, means holding said shells together to define a housing chamber, a fixed contact mounted in said chamber, and a cover secured to said shells for use in mounting said circuit breaker on a central panel, said shells having abutments thereon engaging said frame mechanism at a plurality of locations adjacent respective extremities of said frame to completely entrap said frame in a fixed location within said chamber so that movement of said arm engages and disengages said movable contact with said fixed contact to close and open a circuit; and manually operable means connected to said frame mechanism for moving said arm to engage and disengage said movable contact with said fixed contact.

13. A circuit breaker comprising a substantially U-shaped frame having a back portion and a pair of legs extending from said back portion, said legs each having a locating surface at each of the four extremities thereof, said surfaces on each leg being rectilinearly disposed with respect to each other; a pair of mating, insulating shells each having four abutments thereon; means holding said shells together to define a housing chamber and to engage said abutments with said respective frame surfaces for completely entrapping said frame in a fixed location within said chamber; a cover secured to said shells having means for mounting said circuit breaker on a control panel; an electrical contact fixedly mounted on said shells; a movable arm mounting a movable contact at one end, said arm being mounted on said frame for movement to engage and disengage said movable contact with said fixed contact to close and open a circuit; a manually operable member mounted on said cover for movement between first and second positions; a linkage connected at one end to said member and at its opposite end to said arm, said linkage moving said arm to engage said contacts in response to movement of said member to said first position, said linkage being collapsible in response to movement of said member from said first position to said second position; means biasing said arm to disengage said contacts when said linkage is collapsed; and magnetic means mounted on said frame for collapsing said linkage in response to predetermined conditions in said circuit independent of the position of said member.

14. A circuit breaker as set forth in claim 13 wherein at least one of said legs has a notch therein permitting some deformation of said leg between the locating surfaces thereof, said frame leg being force-fitted between said shell abutments.

15. A circuit breaker as set forth in claim 13 wherein said member is pivotally connected to said linkage by means of a pivot pin and wherein said frame has a camming surface facing said movable arm, said frame being wedgingly engaged with said camming surface when said member is in said first position for holding said contacts engaged with selected force.

16. A circuit breaker comprising a substantially U-shaped frame having a back portion and a pair of legs extending from said back portion; a first pivot pin extending through each of said frame legs adjacent one extermity thereof; a movable contact arm having a slot therein at one end fitted over said first pivot pin between said legs, said arm mounting a movable contact at its opposite end; a second pivot pin extending through each of said frame legs adjacent an opposite extremity thereof; a manually operable member pivotally mounted on said second pin between said legs; a pair of mating, insulating shells having abutments thereon; means holding said shells together to define a housing chamber and to engage said abutments with each end of said first and second pivot pins for completely entrapping said frame in a fixed location within said chamber; a chamber cover secured to said shells for use in mounting said circuit breaker on a control panel, said cover having an opening therein through which said normally operable member extends; a fixed contact mounted in said shells; a linkage connected at one end to said member and at its opposite end to said arm at a location between said movable contact and slot, said linkage pivoting said arm on said first pin to engage said movable contact with said fixed contact to close a circuit and subsequently pivoting said arm around said fixed contact to obtain wiping action between said contacts in response to movement of said member to a first position, said linkage being collapsible during movement of said member from said first position to a second position; means biasing said arm to disengage said contacts when said linkage is collapsed; and magnetic means mounted on said frame for collapsing said linkage in response to predetermined conditions in said circuit independent of the position of said member.

17. A circuit breaker as set forth in claim 16 wherein said frame legs each have a slot in an edge thereof and wherein said magnetic means comprise magnetic coil means mounted on said frame and interposed in said circuit, a third pivot pin having its ends fitted into said respective frame slots, an element mounted for rotation on said third pin, said elements having an armature leg to be attracted by said magnetic coil means in response to predetermined conditions in said circuit for rotating said element in one direction and a trip leg to engage and collapse said linkage in response to rotation of said element in said one direction; coil spring means connected to said third pin and to said element, said third pin being selectively rotated in said frame slots with respect to said element for selectively biasing said element for rotation opposite to said one direction, an integral stop portion on said frame normally engaging said armature leg for locating said armature leg in selected spaced relation to said magnetic coil means, said frame being deformed at said frame slots for locking said third pin in said slots to maintain said selected bias on said element.

References Cited

UNITED STATES PATENTS

| | | | |
|---|---|---|---|
| 2,360,922 | 10/1944 | Wilckens | 335—174 |
| 2,427,998 | 9/1947 | Wilckens | 335—174 X |
| 2,689,282 | 9/1954 | Wilckens | 335—8 |
| 2,690,486 | 9/1954 | Wilckens | 335—161 |
| 2,759,063 | 8/1956 | Rypinski | 335—174 |
| 3,182,151 | 5/1965 | Coughlin | 335—17 |

BERNARD A. GILHEANY, *Primary Examiner.*

R. N. ENVALL, Jr., *Assistant Examiner.*